United States Patent [19]
Miyata et al.

[11] Patent Number: 5,643,079
[45] Date of Patent: Jul. 1, 1997

[54] INSIDE AND OUTSIDE AIR SWITCHING APPARATUS FOR AUTOMOTIVE AIR CONDITIONER

[75] Inventors: Manabu Miyata, Obu; Koji Ito, Nagoya; Teruhiko Kameoka, Okazaki; Kazushi Shikata; Koji Matsunaga, both of Kariya; Hikaru Sugi, Nagoya, all of Japan

[73] Assignee: Nippondenso Co., Ltd., Kariya, Japan

[21] Appl. No.: 598,318

[22] Filed: Feb. 8, 1996

[30]      Foreign Application Priority Data

Feb. 9, 1995   [JP]   Japan .................................. 7-021640

[51] Int. Cl.$^6$ .................................................. B60H 3/06
[52] U.S. Cl. .................. 454/139; 55/467; 55/500; 55/521; 454/158
[58] Field of Search ........................... 454/139, 158; 55/467, 471, 500, 521

[56]               References Cited

U.S. PATENT DOCUMENTS 5,391,112   2/1995   Wardlaw .................................. 454/139

Primary Examiner—Harold Joyce
Attorney, Agent, or Firm—Cushman, Darby & Cushman IP Group of Pillsbury Madison & Sutro LLP

[57]            ABSTRACT

A filter is disposed so as to cross at right angle to an airflow from an inside air inlet and an outside air inlet to an inlet port. The filter is made of a filter element formed in a corrugated shape by folding and is deformable so that a width of the filter in the axis direction of said rotary door could be shortened. Thus, it is possible to shorten the width of the filter in the axial direction of the rotary shaft by deforming the outer shape of the filter, therefore, the filter is easily taken out from the inside air inlet. Furthermore, since the filter can be taken out from the inside air inlet, the filter can be attached or detached without disassembling the inside and outside air switching case and casing for a blower fan, the working efficiency for cleaning and changing the filter being thereby improved.

12 Claims, 4 Drawing Sheets

INSIDE AND OUTSIDE AIR SWITCHING APPARATUS FOR AUTOMOTIVE AIR CONDITIONER

BACKGROUND OF THE INVENTION

1. Field of the Invention

The present invention relates to an inside and outside air switching apparatus for an automotive air-conditioner.

2. Description of Related Art

In a conventional inside and outside air switching apparatus for an automotive air conditioner, as shown in FIG. 7, there is a flat door system where a flat filter 9 is disposed at right angle to an air flowing from an inside air inlet 72 and an outside air inlet 71 to an inlet port 102 and the inside air inlet 72 and the outside air inlet 71 are open and closed by a rotation of a flat door 8.

In another conventional apparatus, as disclosed in U.S. Pat. No. 5,391,112, a filter formed in an arcuate shape is disposed in a rotary door.

In the above-mentioned conventional inside and outside air switching apparatus for an automotive air conditioner using the flat door system, when the flat filter 9 is disposed in an air duct, the flat filter 9 needs to be positioned lower than the operating space of the flat door 8 to keep the flat door 8 being operated smoothly. As a result, the distance between the flat door 8 and the flat filter 9 is enlarged, thereby making the size of the inside and outside air switching apparatus larger.

To overcome the above problem, as shown in U.S. Pat. No. 5,391,112, by using an arcuate rotary door and disposing a filter in the rotary door, the size of the inside and outside air switching apparatus for automotive air conditioner can be made smaller as compared to the switching apparatus using the flat door.

However, in the inside and outside air switching apparatus for an automotive air-conditioner using the rotary door, since upper and lower cases need to be disassembled when cleaning or exchanging a filter, there is a problem in that the apparatus has an disadvantage of the working efficiency for cleaning and exchanging the filter.

SUMMARY OF THE INVENTION

In view of the above problem, it is therefore an object of the present invention to provide an inside and outside air switching apparatus for an automotive air-conditioner, which switches the inside and outside air by a rotary door, capable of detaching the filter easily without disassembling the upper and lower cases.

According to the present invention, a filter is disposed so as to cross at right angle to an airflow from an inside air inlet and an outside air inlet to an inlet port. The filter is made of a filter element formed in a corrugated shape by folding and is deformable so that a width of the filter in the axis direction of said rotary door could be shortened.

Thus, it is possible to shorten the width of the filter in the axial direction of the rotary shaft by deforming the outer shape of the filter, therefore, the filter is easily taken out from the inside air inlet. Furthermore, since the filter can be taken out from the inside air inlet, the filter can be attached or detached without disassembling the inside and outside air switching case and casing for a blower fan, the working efficiency for cleaning and changing the filter being thereby improved.

When the filter is formed in a curved configuration, the filtration area can be enlarged without increasing the cross-sectional area of the air passage as compared to the conventional filter.

When an end portion of said filter in a direction at right angle to the folding direction of said filter faces said inside air inlet, the filter can be easily taken out of the inside and outside air switching case to be cleaned and changed, thereby further improving the working efficiency for cleaning and changing the filter.

When the air introduced from one of the plurality of the inside air inlets partitioned by the filter is taken in the inlet port without passing through said filter, an airflow resistance due to the filter can be reduced. As a result, the amount of introduction air can be increased.

When a rotary door includes an arcuate door member for opening and closing the inside air inlet and the outside air inlet; a door supporting member connected at right angle to an end portion of the arcuate door member in the axial direction; and the rotary shaft provided on the door supporting member as a center of rotation of the rotary door and the filter is disposed between the arcuate door member and the rotary shaft, the size from the inside air inlet and the outside air inlet to the filter can be made smaller, as a result, the size of the outer shape of the apparatus can be further made smaller.

When the inside air inlet includes a detachable lattice-like cover member, the working efficiency for cleaning and changing the filter is improved, and it is prevented for an extraneous material from going into the inside and outside air switching case from the inside air inlet.

Further, when a supporting portion is provided between the inlet port and the filter to maintain the configuration of the filter, the filter can be prevented from being deformed due to the air pressure of the air by the blower fan, and the folding configuration of the filter can be maintained. The same effect as described above can be also obtained.

BRIEF DESCRIPTION OF THE DRAWINGS

The other objects, features, aspects and advantages of the present invention will become better understood with respect to the following detailed description, appended claims and accompanying drawing in which like reference numerals represent similar parts throughout the several views, and wherein:

DETAILED DESCRIPTION OF THE PREFERRED EMBODIMENTS

Several embodiments of the present invention will hereinafter be described with respect to the accompanying drawings.

Figure 1:
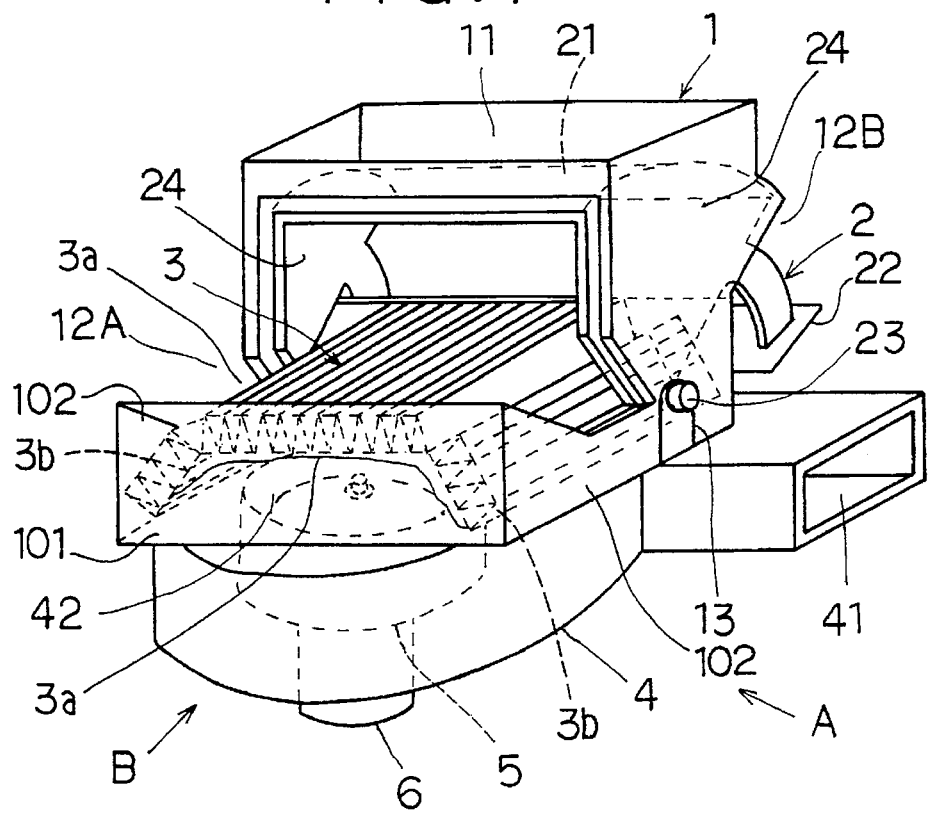
FIG. 1 is a perspective view which illustrates an inside and outside air switching apparatus for an automotive air conditioner in accordance with a first embodiment of the present invention.
Figure 2:
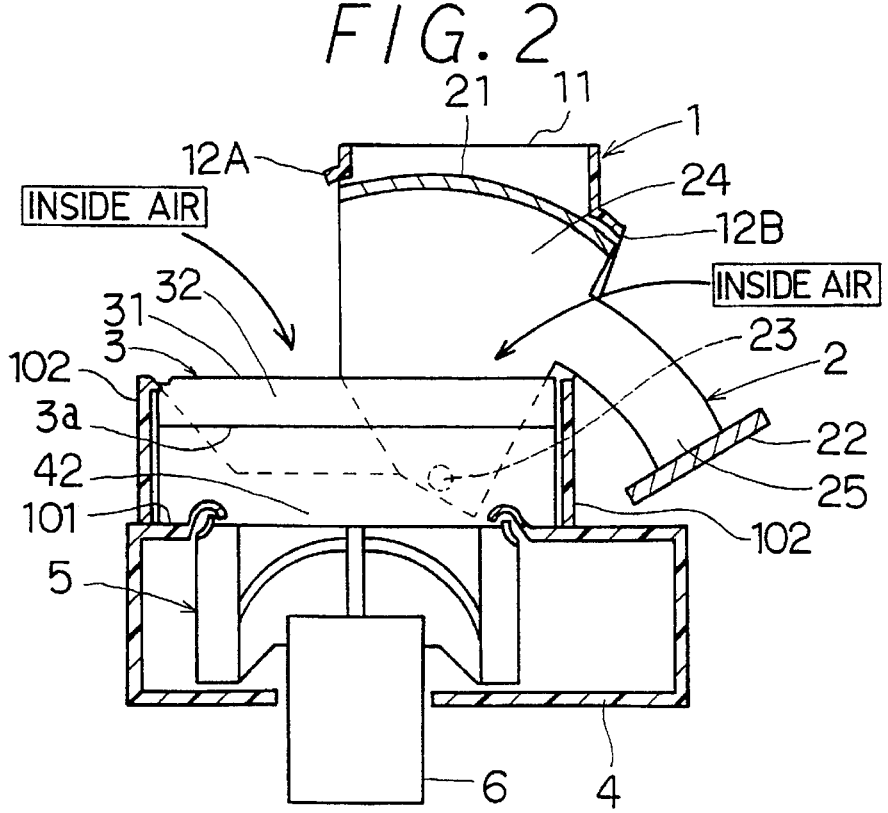
FIG. 2 is a vertical cross-sectional view taken along the center line of a blower fan as seen from an arrow A of FIG. 1, in which an inside air is introduced.
Figure 3:
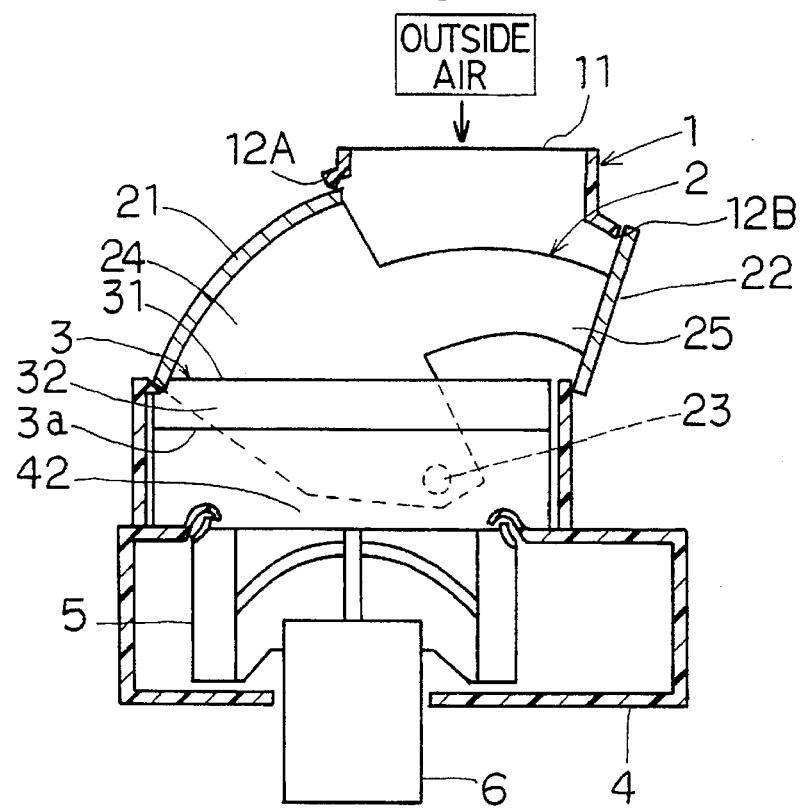
FIG. 3 is a vertical cross-sectional view taken along the center line of the blower fan as seen from an arrow A of FIG. 1, in which an outside air is introduced.
Figure 4:
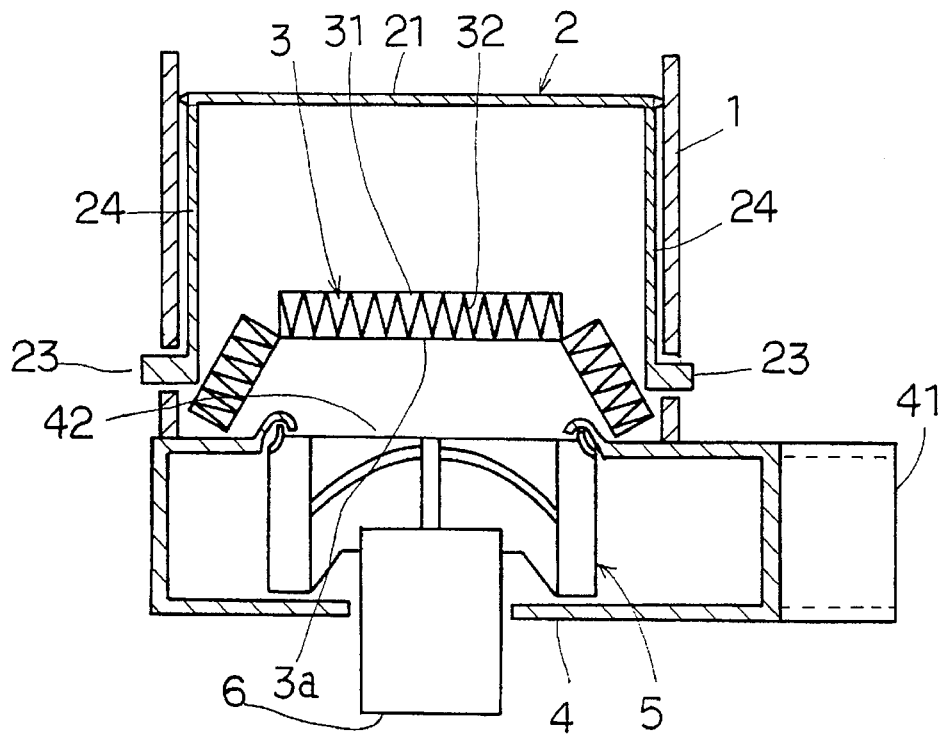
FIG. 4 is a transverse cross-sectional view taken along the center line of the blower fan as seen from an arrow B of FIG. 1.

A first embodiment of the present invention is described with reference to FIGS. 1 through 4. FIG. 1 is a general perspective view illustrating an inside and outside air switching apparatus for an automotive air conditioner. FIGS. 2 and 3 are perspective diagrams as seen from both left and right side of the apparatus shown in FIG. 1, and FIG. 4 is a perspective diagram as seen from an arrow B of FIG. 1.

An inside and outside air switching apparatus for an automotive air conditioner, as illustrated in FIG. 1, is generally disposed below a dash board at an opposite front seat to the driver's seat in a passenger compartment for switching between the air inside the passenger compartment (hereinafter referred to inside air) and the air outside the passenger compartment (hereinafter referred to outside air) to be introduced into the passenger compartment.

An inside and outside air switching case 1 is made of synthetic resin, such as polypropylene, and is disposed adjacent to a casing for a blower fan 4 at a side of an inlet port 42 thereof. The inside and outside air switching case 1 includes first and second inside air inlets 12A and 12B disposed in a line for introducing the inside air and an outside air inlet 11 for introducing the outside air. These inside and outside air inlets are connected to the inlet port 42, respectively.

The second inside air inlet 12B is provided on the surface of the inside and outside air switching case 1 in a rotating direction of a rotary door 2, which will be described later. In addition, a U-shaped groove 13 for supporting a rotary shaft 23 is also provided at the lower side surface of the inside and outside air switching case 1.

The rotary door 2 made of synthetic resin, such as polypropylene, is rotatably disposed in the inside and outside air switching case 1 with respect to the axis of the rotary shaft 23.

The rotary door 2 includes an arcuate door member 21, a fan-shaped door supporting member 24 integrally extending at a right angle from each end of the arcuate door member 21 (each end of the rotary shaft in the axis direction) to be integrated with the arcuate door member 21, and a flat door member 22 provided at the end portion in the rotating direction of the arcuate door member 21. The first inside air inlet 12A and the outside air inlet 11 are selectively open and closed by the arcuate door member 21.

The flat door member 22 is connected to the rotary door 2 via a stay member 25 integrally formed with the door supporting member 24 so as to extend therefrom. The second inside air inlet 12B is open and closed by the flat door member 22.

A filter 3 is disposed inside the arcuate door member 21 of the rotary door 2 in the inside and outside air switching case 1. The detail of the filter 3 will be described later.

A scroll-type blower case 4 made of synthetic resin such as polypropylene or the like, includes a bellmouth-shaped inlet port 42 having an opening in an upper direction at the center of the scroll of the case and an outlet port 41 in a tangent direction at the edge of the scroll to form an air passage inside. In the blower case 4, a centrifugal multiblade fan (scirocco fan) as a blower 5 and a motor for driving the blower 5 are disposed.

The filter 3 is formed by folding filter element made from Japanese paper or urethane porous in a corrugated configuration (wavy shape). Generally, this kind of filter 3 includes a frame made of synthetic resin or metal corresponding to its shape. However, in consideration of the reduction of the filtration area (reduction of the airflow area) due to the frame and the increase of manufacturing cost for the frame, no frame is provided in the filter 3 in this embodiment.

The filter 3 is provided in the inside and outside air switching case 1 at a downstream side of the first inside air inlet 12A with respect to the airflow in the inside and outside air switching case 1, the second inside air inlet 12B and the outside air inlet 11 with respect to air flow, independently from the rotary door 2. In addition, the filter 3 is disposed at a downstream side of the rotary door 2 so as to cross the airflow from the first inside air inlet 12A, the second inside air inlet 12B and the outside air inlet 11 to the inlet port 42. Each end of the filter 3 is in such a manner that filter 3 is formed in a trapezoid configuration having a convexity toward the arcuate door member 21. Further, each end of the filter 3 is folded in such a manner that the folding direction of the filter 3 crosses at right angle to the rotating direction of the rotary door 2. The progress direction of corrugated configuration of the filter 3 corresponds to the folding direction of the filter 3.

Accordingly, the filter 3 includes a rectangular plate-like parallel portion 3a and a pair of inclination portions 3b inclined from each end of the parallel portion 3a to the side of the inlet port 42 so as to gradually separate away from each other.

These parallel portion 3a and the inclination portions 3b have enough rigidity to maintain their own shape in a normal condition. As the parallel portion 3a and the inclination portions 3b are formed by folding at the lowest portions of the corrugated configuration, the formability of the filter 3 is improved as compared to the filter 3 folded so as to cross the progress direction of the corrugated configuration.

The inclination portions 3b are deformable in such a manner that the inclination portions 3b are close enough to the parallel portion 3a. In this way, the outer shape of the filter 3 is deformable so that a width of the filter 3 in the direction of rotary shaft 23 is decreased, as shown in FIG. 1.

This filter 3, as shown in FIGS. 1 and 2, is disposed in such a manner that inclined bottom ends of the inclination portions 3b are in contact with both an upper surface 101 of the blower case 4 where the inlet port 42 is open and side walls where one end of the rotary shaft 23 is connected.

In the above-mentioned condition, the parallel portion 3a of the filter 3 is apart from the inlet port 42 in a predetermined distance in such a manner that the parallel portion 3a is in parallel with the opening flat surface of the inlet port 42 and disposed between the arcuate door 24 and the rotary shaft 23. The both end portions of the filter 3 in the axial direction of the rotary shaft 23 are disposed to form a minute clearance with the side walls 102 of the inside and outside air switching case 1 without interfering the rotation of the door supporting member 24 as illustrated in FIG. 1.

An operation of the first embodiment of the present invention will be described.

An inside air introducing mode and an outside air introducing mode are switched by the rotation of the rotary door 2 with the rotary shaft 23 as a center. At this time, the arcuate door member 21 of the rotary door 2 opens and closes the first inside air inlet 12A and the outside air inlet 11, while the flat door member 22 opens and closes the second inside air inlet 12B.

In the inside air introducing mode, the rotary door 2 is in a rotational position as shown in FIG. 2. The inside air is introduced from the inside air inlets 12A and 12B, after having passed through the filter 3, is sucked from the inlet port 42 and is discharged out of the outlet port 41.

In the outside air introducing mode, the rotary door 2 is in a position as shown in FIG. 3. the outside air is introduced from the outside air inlet 11, after having passed through the filter 3, is sucked from the inlet port 42, and is discharged out of the outlet port 41.

Next, a method for attaching and detaching the above-mentioned filter 3 will be described.

Such filter 3 functions to remove dust included in the filtered inside and outside air. However, the filter is used for long time, the ability for removing the dust is deteriorated. Therefore, the filter 3 needs to be cleaned or changed.

In the first embodiment, at first, the rotary door 2 is rotated in the predetermined rotational position for the inside air introducing mode. An operator put his hand in the open inside air inlet 12a in the vehicle to lift the end portion (shown in the front side in FIG. 1) of the filter 3 toward the upper direction in FIG. 1 and folds the inclination portions 3b toward the parallel portion 3a so that the inclined portions 3b come closer each other. (It may be possible that the inclined portions 3b spontaneously come closer each other when the filter 3 is lifted.)

Accordingly, the shape of the filter 3 is deformed, and the width of the filter 3 in the direction of the rotary shaft 23 (the right and left direction in FIG. 1) becomes smaller than the size of the inside air inlet 12A. In this condition, the filter 3 can be easily removed from the vehicle through the inside air inlet 12A. As a result, it is easy to clean and change the filter 3 without disassembling the inside and outside air switching case 1 and the blower case 4.

As the filter 3 is folded into a trapezoid configuration, the filtration area can be increased as compared to the conventional filter, without enlarging the width and depth of the switching apparatus.

In addition, as the lower surface of the parallel portion 3a of the filter is disposed between the arcuate door member 21 and the rotary shaft 23 as illustrated in FIG. 4, the distance between the lower surface of the parallel portion 3a of the filter 3 and each of the first inside air inlet 12A and the outside air inlet 11 can be made smaller, thereby minimizing the height of the switching apparatus.

A second embodiment of the present invention will be described below.

The second embodiment differs from the first embodiment in the constitutions of the inside and outside air switching case 1 and the rotary door 2 and a supporting member 200 for supporting filter in the blower case 4.

Figure 5:
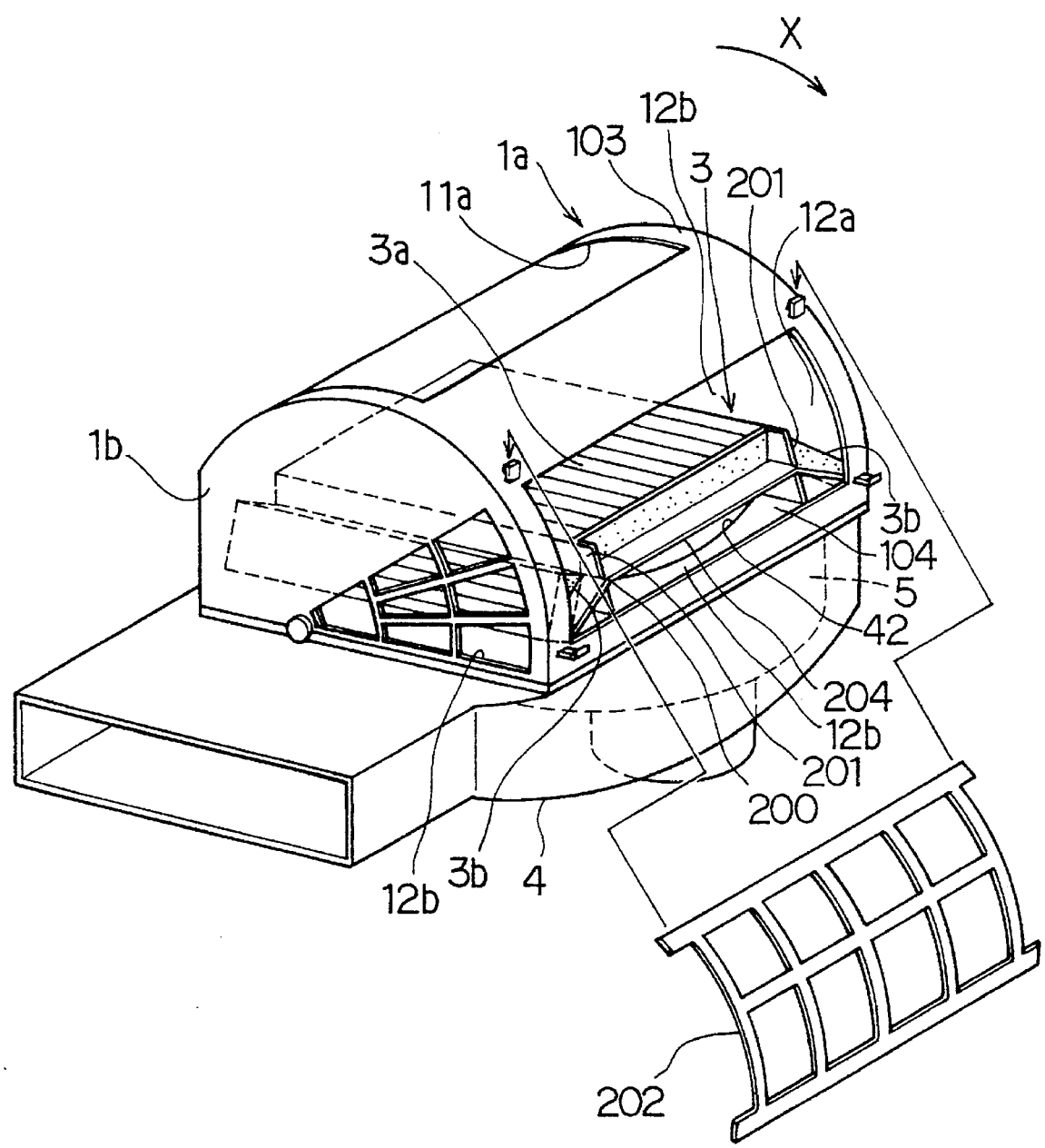
FIG. 5 is a perspective view illustrating an inside and outside air switching apparatus for an automotive air conditioner in accordance with a second embodiment of the present invention.

As shown in FIG. 5, an inside and outside air switching case 1a is formed in a generally semi-cylindrical configuration. The inside and outside air switching case 1a has an outside air inlet 11a and an inside air inlet 12a along a circumferential direction of an arcuate outer wall portion 103. In addition, a fan-shaped second inside air inlet 12b is provided on one end portion of the inside and outside air switching case 1a along the axial direction.

These inside and outside air inlets 11a, 12a and 12b (not shown in FIG. 5) are open and closed by the rotary door which differs from the rotary door 2 according to the first embodiment in that the stay member 25 and flat door member 22 are not provided (that is, the rotary door consists of the arcuate door member 21 and the door supporting member 24). The second inside air inlet 12b is open and closed by the door supporting member 24.

The filter 3 is disposed between the inside and outside air switching case 1a and the blower case 4 in the same manner as in the first embodiment. Here, a supporting member 200 is provided on the upper surface 104 of the blower case 4 to maintain the filter 3 in a trapezoid configuration by contacting with the bottom of the filter 3. Not shown in FIG. 5, the supporting member 200 is formed in for example, a trapezoid configuration corresponding to the configuration of the bottom (including the bottoms of the above-mentioned flat portion 3a and the inclination portions) of the filter 3, thereby preventing the filter 3 from being deformed due to the air pressure of the blower fan 5. In addition, the supporting portion 200 includes a protruding supporting member 201 protruding in the opposite direction to the direction of the air passing through the filter.

Out of end portions of the filter in the rotation direction of the rotary door 2 (the direction shown by X in FIG. 1), the end portion at the side of the outside air inlet 11 is disposed in contact with a wall portion 1b of the inside and outside air switching case 1a located below the outside air inlet 11a. That is, the filter 3 is in contact with the wall portion 1a and the protruding support member 201 in a manner that the filter is supported between the wall portion 1a and the protruding support member 201. As the filter 3 is seen from the inside air inlet 12a to the outside air inlet 11a in FIG. 5, the width of the filter 3 in the direction crossing at right angle to the rotating direction of the rotary door (the direction shown by X in FIG. 5) is larger than that of the inside air inlet 12a to enlarge the ventilation area of the filter 3. (The projected area of the filter 3 is larger than that of the first inside air inlet 12a.)

On the other hand, the end portion at the side of the inside air inlet 12a is disposed so as to face precisely to the inside air inlet 12a. For this reason, the first inside air inlet 12a is partitioned by the filter 3 into a first inside air inlet 12b which opens at the an upstream side of the filter 3 and a second inside air inlet 12c which opens at a downstream side of the filter 3 with respect to the airflow.

In the inside air inlet 12a, a detachable lattice-like cover member 202 is mounted on the outer surface of the inside and outside air switching case 1a. The filter 3 can be changed by detaching the cover member 202 from the inside and outside air switching case 1a.

An operation of the inside and outside air switching apparatus for an automotive air conditioner of the second embodiment will be simply described. In an inside air introducing mode, the rotary door closes the outside air inlet 11a, the aforementioned first and second inside air inlets 12b and 12c are open. The air introduced from the first inside air inlet 12b passes through the filter 3, while the air introduced from the second inside air inlet 12c is sent directly to the inlet port 42 without passing through the filter 3.

That is, in the inside air introducing mode, as the air in the passenger compartment is comparatively clean, it is not necessary to remove dust in the air strictly, as compared to the outside air introducing mode. However, there is a problem that when the filter 3 is disposed in the inside and outside air switching case 1, the airflow resistance is increased and it is difficult to obtain the necessary amount of air.

As a conventional air conditioner for vehicles, an apparatus which controls introduced air automatically according to the heat load in the passenger compartment has been known, however, according to this automatic control, the inside air introducing mode is automatically selected in an air conditioning operation mode where the inside of the passenger compartment needs to be cooled quickly when the temperature in the passenger compartment is highly increased, for example, when the vehicle is parked under the burning sun in summer season. In such a case, the maximum amount of air needs to be blown into the passenger compartment.

However, in the second embodiment, as the air does not pass through the filter completely in the inside air introduction mode, the amount of air sucked from the inlet port 42 can be increased, and thereby the amount of air introduced into the passenger compartment can be increased in the above air conditioning operation mode.

On the other hand, in the outside air introduction mode where the rotary door closes the first and second inside air inlets 12b and 12c, the outside air inlet 11a is open, and all of the air sucked form the outside passes through the filter 3, thereby the dust in the outside air being thereby removed. In this embodiment, when the rotary door closes the first and second inside air inlets 12b and 12c, slight amount of the outside air may be bypassed through the filter 3 unless the clearance between the inside surface of the rotary door and the end portion 204 of the supporting member 200 is sealed. To solve this problem, a seal member made of rubber or the like is provided at the inside surface of the rotary door in a such manner that the seal member seals is in contact with the end portion 204 when the rotary door 2 is rotated in the predetermined rotational position for the outside air introduction mode (not shown in figures).

A method for attaching and detaching the above-mentioned filter 3 in the second embodiment will be described.

First, the rotational position of the rotary door is set to the inside air introduction mode. The cover member 202 is detached from the inside and outside case to open the first and second inside air inlets 12b and 12c directly to the passenger compartment. In this condition, since the end portion of the filter 3 is disposed so as to face to the inside air inlet 12a as described above, the operator can easily put his hand to the filter as compared to the first embodiment.

After that, or at the same time, the end portion of the filter 3 (end portion of the inside air inlet side) is lifted in an upper direction in FIG. 5 to release the filter 3 from being sandwiched between the above-mentioned projecting supporting member 201 and the wall portion 1b. In this condition, the inclination portions 3b are folded toward the parallel portion 3a so that the inclined portions 3b spontaneously come closer each other and the width of the filter 3 in the axial direction is made smaller.

That is, in the second embodiment, as the width of the filter 3 is larger than that of the inside air inlet 12a, it is difficult to take the filter 3 out of the inside and outside air switching case 1. However, when the inclination portions 3b are folded, it is easy to take the filter 3 out of the inside air inlet 12a, because the width of the filter 3 is smaller than that of the inside air inlet 12a. In addition, the cover member 202 is usually attached on the inside and outside air switching case 1a except when the filter 3 is cleaned or changed, thereby preventing the extraneous material from going into the passenger compartment.

Two embodiments of the present invention are described above, however, the present invention can be applied to the following modifications which will be described below.

Figure 6:
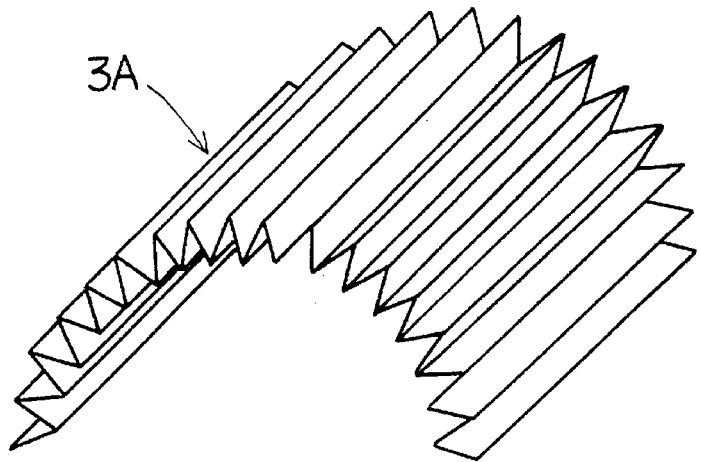
FIG. 6 is a view illustrating a modification of a filter portion of the filter 3A, which is formed in a semi-cylindrical configuration.
Figure 7:
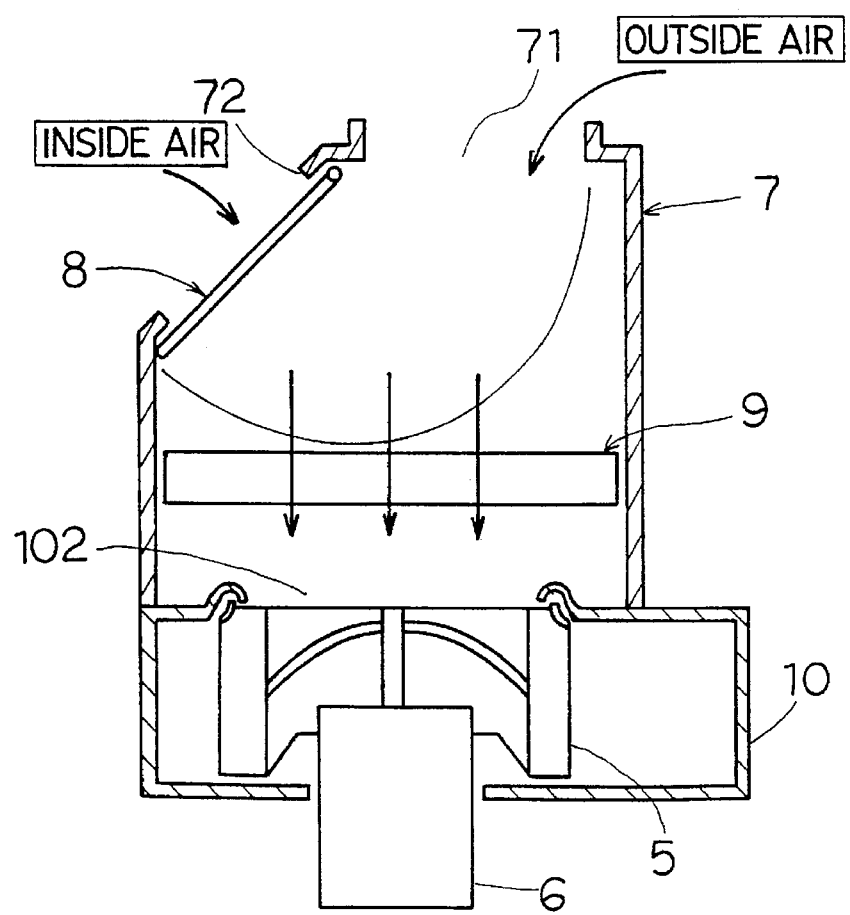
FIG. 7 is a cross-sectional view illustrating a conventional inside and outside air switching apparatus for an automotive air conditioner using a flat door system.

A filter 5A formed in a semi-circular configuration shown in FIG. 6 can be applied to the present invention instead of the filter 3 formed in a trapezoid configuration in the above embodiments.

In the above embodiments, the parallel portion 3a and the inclination portions 3b of the filter 3 has enough rigidity to maintain their configuration in a normal condition, however, in the modification, a filter having more flexible parallel portion and the inclination portions can be used if the above-mentioned supporting member 200 is provided.

Although the present invention is applied to an inside and outside air switching apparatus for an automotive air conditioner having an inside air introduction mode and an outside air introduction mode in the above embodiments, the present invention can be also applied to an inside and outside air switching apparatus for the air conditioner having an air introduction mode where both inside air and outside air are simultaneously introduced to the inlet port 42.

The present invention has been described in connection with what are presently considered to be most practical preferred embodiments. However, the invention is not meant to be limited to the disclosed embodiments, but rather is intended to include all modifications and alternative arrangements included within the spirit and scope of the appended claims.

What is claimed is:

1. An inside and outside air switching apparatus for automotive air conditioner comprising:

a blower fan;

a blower case for housing said blower fan, said case having an inlet port at an upstream side of said blower fan and an outlet port at a downstream side of said blower fan and forming an air passage for introducing air sucked from said inlet port to said outlet port;

an inside and outside air switching case disposed at an upstream side of said inlet port and having an inside air inlet and outside air inlet which are connected to said inlet port;

a rotary door having a rotary shaft and being rotatably supported in said inside and outside air switching case with said rotary shaft as a center to open and close said inside air inlet and said outside air inlet; and a filter disposed in said inside and outside air switching case at a downstream side of said inside air inlet and said outside air inlet, independently from said rotary door, wherein said filter is disposed so as to cross an airflow from said inside air inlet and said outside air inlet to said inlet port, and said filter is made of a filter element formed in a corrugated configuration by folding and is deformable to shorten a width of said filter in the axis direction of said rotary door.

2. An inside and outside air switching apparatus for automotive air conditioner according to claim 1, wherein said filter is formed in a curved configuration.

3. An inside and outside air switching apparatus for automotive air conditioner according to claim 2, wherein said filter is bent into a trapezoid shape or a semi cylindrical shape with a bending direction along an axis of said rotary shaft.

4. An inside and outside air switching apparatus for automotive air conditioner according to claim 3, wherein said filter is disposed in such a manner that a progress direction of said corrugated configuration of said filter is same as the axial direction of said rotary shaft.

5. An inside and outside air switching apparatus for automotive air conditioner according to claim 4, wherein said filter is disposed at a downstream side of said rotary door with respect to the airflow and is bent into a convexity toward said rotary door.

6. An inside and outside air switching apparatus for automotive air conditioner according to claim 3, wherein said filter further includes a parallel portion approximately in parallel with a flat surface of said inlet port and a pair of inclination portions inclined from each end of said parallel portion so as to gradually separate away from each other, said inclination portions are deformable to come closer each other.

7. An inside and outside air switching apparatus for automotive air conditioner according to claim 1, wherein an end portion of said filter in a direction at right angle to the folding direction of said filter faces said inside air inlet.

8. An inside and outside air switching apparatus for automotive air conditioner according to claim 3, wherein said inside and outside air switching case includes a plurality of said inside air inlets.

9. An inside and outside air switching apparatus for automotive air conditioner according to claim 8, wherein said plurality of said inside air inlet are partitioned by said filter, and air introduced from one of said plurality of said inside air inlets is taken in said inlet port without passing through said filter.

10. An inside and outside air switching apparatus for automotive air-conditioner according to claim 4, wherein said rotary door includes:
   an arcuate door member for opening and closing said inside air inlet and said outside air inlet;
   a door supporting member connected at right angle to an end portion of said arcuate door member in the axial direction; and
   said rotary shaft provided on said door supporting member as a center of rotation of said rotary door, and
   said filter is disposed between said arcuate door member and said rotary shaft.

11. An inside and outside air switching apparatus for automotive air-conditioner according to claim 1, wherein said inside air inlet includes a detachable lattice-like cover member.

12. An inside and outside air switching apparatus for automotive air conditioner according to claim 2, wherein a supporting member for maintaining a configuration of said filter is disposed between said inlet port and said filter.

* * * * *